United States Patent
Prakash et al.

(10) Patent No.: US 8,571,553 B2
(45) Date of Patent: Oct. 29, 2013

(54) METHODS AND APPARATUS FOR RESOLVING PILOT PSEUDORANDOM NOISE CODE CONFLICTS IN A COMMUNICATION SYSTEM

(75) Inventors: Rajat Prakash, La Jolla, CA (US); Alexei Gorokhov, San Diego, CA (US); Fatih Ulupinar, San Diego, CA (US); Parag Arun Agashe, San Diego, CA (US); Pranav Dayal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1014 days.

(21) Appl. No.: 12/171,479

(22) Filed: Jul. 11, 2008

(65) Prior Publication Data
US 2009/0023464 A1 Jan. 22, 2009

Related U.S. Application Data

(60) Provisional application No. 60/950,094, filed on Jul. 16, 2007.

(51) Int. Cl.
*H04W 4/00* (2009.01)
*H04W 36/00* (2009.01)
*H04B 17/00* (2006.01)
*H04B 1/00* (2006.01)

(52) U.S. Cl.
USPC ........ 455/435.2; 455/436; 455/438; 455/439; 455/63.1; 455/67.11; 455/67.13; 455/442; 455/443; 375/145; 375/240.28

(58) Field of Classification Search
USPC .......... 455/435.2, 436, 438, 439, 63.1, 67.11, 455/67.13, 442, 443; 375/145, 240.28
See application file for complete search history.

(56) References Cited

U.S. PATENT DOCUMENTS 6,741,863 B1 5/2004 Chiang et al.
7,970,401 B2 6/2011 Donovan et al.
(Continued)

FOREIGN PATENT DOCUMENTS

CN 1681354 A 10/2005
JP 2000032531 A 1/2000
(Continued)

OTHER PUBLICATIONS

3GPP "Physical Layer for Ultra Mobile Broadband (UMB) Air Interface Specification" 3rd Generation Partnership Project (3GPP): Technical Specidication (TS), Apr. 5, 2007, pp. 1-28, XP007905179.

(Continued)

*Primary Examiner* — Christopher M Brandt
*Assistant Examiner* — Muthuswamy Manoharan
(74) *Attorney, Agent, or Firm* — John J. Ketchum (57) ABSTRACT

Automated PilotPN code conflict resolution using an access point with the assistance of one or more access terminals is disclosed. An exemplary method includes determining a set of access points, as well as determining a set of PilotPN codes used by the set of access points. Detection is then made concerning whether at least two access points of the set of access points have conflicting PilotPN codes. A first PilotPN code is allocated to one of the at least two access points having conflicting PilotPN codes. Additionally, one or more other PilotPN codes, which are distinct from the first PilotPN code, are allocating to remaining access points of the at least two access points having conflicting PilotPN codes. Corresponding apparatus and other exemplary methods are also disclosed.

26 Claims, 7 Drawing Sheets

(56) References Cited

U.S. PATENT DOCUMENTS

| | | | |
|---|---|---|---|
| 7,970,404 B2 * | 6/2011 | Claussen et al. | 455/437 |
| 2002/0004397 A1 | 1/2002 | Lee et al. | |
| 2004/0174845 A1 | 9/2004 | Koo et al. | |
| 2005/0099972 A1 | 5/2005 | Motegi et al. | |
| 2006/0030327 A1 * | 2/2006 | Lee et al. | 455/442 |
| 2006/0052106 A1 * | 3/2006 | Park | 455/436 |
| 2008/0039141 A1 * | 2/2008 | Claussen et al. | 455/561 |
| 2008/0153533 A1 * | 6/2008 | Claussen et al. | 455/522 |
| 2008/0207170 A1 * | 8/2008 | Khetawat et al. | 455/411 |
| 2010/0178921 A1 * | 7/2010 | Aqvist et al. | 455/436 |
| 2012/0263032 A1 | 10/2012 | Prakash et al. | |

FOREIGN PATENT DOCUMENTS

| | | |
|---|---|---|
| JP | 2005142967 A | 6/2005 |
| JP | 2005175611 A | 6/2005 |
| RU | 2292669 | 1/2007 |
| WO | WO2004057776 | 7/2004 |
| WO | WO2004080102 A1 | 9/2004 |
| WO | 2005053198 | 6/2005 |
| WO | WO2006004948 | 1/2006 |
| WO | WO2006012405 | 2/2006 |

OTHER PUBLICATIONS

International Search Report—PCT/US2008/070096, International Search Authority—European Patent Office—Nov. 6, 2008.

Written Opinion—PCT/US2008/070096, International Search Authority—European Patent Office—Nov. 6, 2008.

Hung, et al., "Performance Evaluation of the Least Conflict Sharable Spreading Code Assignment Algorithm," IEEE PIMRC, pp. 1207-1211, Oct. 15-18, 1996.

Taiwan Search Report—TW097127047—TIPO—Oct. 13, 2012.

* cited by examiner

METHODS AND APPARATUS FOR RESOLVING PILOT PSEUDORANDOM NOISE CODE CONFLICTS IN A COMMUNICATION SYSTEM

CLAIM OF PRIORITY UNDER 35 U.S.C. §119

The present application for patent claims priority to Provisional Application No. 60/950,094, entitled "Automated Procedure for PilotPN Planning in Wireless Communication Networks," filed Jul. 16, 2007; assigned to the assignee hereof and hereby expressly incorporated by reference herein.

BACKGROUND

1. Field

The present disclosure generally relates to methods and apparatus for resolving pilot pseudorandom noise (PN) code conflicts in a communication system, and more particularly to automated planning of PilotPN codes to resolve such conflicts in a communication system.

2. Background

In wireless communication systems, such as an Ultra Mobile Broadband (UMB) system, identification information such as a pilot pseudorandom noise code (referred to herein as a "PilotPN code" or simply "PilotPN") is used to identify an access point (AP) or base station to an access terminal (AT) or other user equipment. Ideally, each PilotPN for each respective AP is unique. Nonetheless, even if the same PilotPN is used for more than one AP, each PilotPN emanating from a particular AP may have a PN offset different from the counterpart emanating from the another AP to achieve differentiation. If these are not the case, however, a PilotPN conflict scenario may arise. Sometimes, the term "PilotPN conflict" is called a "PilotPN collision" instead. For purposes of this disclosure, the two terms are used interchangeably.

Any PilotPN conflict is undesirable as repeating or even closely offset PilotPNs from different APs can disrupt signal demodulation, decoding, and further network side routing. In order to resolve PilotPN conflict, the occurrence of PilotPN collision has previously been resolved by manual intervention and coordination, which results in increased costs and deployment delays. In accordance with the present disclosure, such collision or conflict may be resolved automatically through PilotPN planning as will be described herein.

SUMMARY

According to an aspect, a method for allocating PilotPN codes in a communication system is disclosed. The method includes determining a set of a plurality of access points, and determining a set of PilotPN codes used by the set of the plurality of access points. The method further includes detecting whether at least two access points of the plurality of access points have conflicting PilotPN codes, and allocating a first PilotPN code to one of the at least two access points having conflicting PilotPN codes. Further, the method includes allocating at least one second PilotPN code distinct from the first PilotPN code to at least one remaining access point of the at least two access points having conflicting PilotPN codes.

According to another aspect, an apparatus for use in allocating PilotPN codes in a communication network is disclosed. The apparatus includes at least one processor that is configured to determine a set of PilotPN codes used by the set of the plurality of access points, detect whether at least two access points of the plurality of access points have conflicting PilotPN codes, allocate a first PilotPN code to one of the at least two access points having conflicting PilotPN codes, and allocate at least one second PilotPN code distinct from the first PilotPN code to at least one remaining access point of the at least two access points having conflicting PilotPN codes. The apparatus also includes a memory coupled to the at least one processor.

According to still a further aspect, an apparatus for use in a communication system is disclosed. The apparatus includes means for determining a set of a plurality of access points; means for determining a set of PilotPN codes used by the set of the plurality of access points, as well as means for detecting whether at least two access points of the plurality of access points have conflicting PilotPN codes. The apparatus also includes means for allocating a first PilotPN code to one of the at least two access points having conflicting PilotPN codes, and means for allocating at least one second PilotPN code distinct from the first PilotPN code to at least one remaining access point of the at least two access points having conflicting PilotPN codes.

According to yet one further aspect, a computer program product is disclosed that includes a computer-readable medium. The computer-readable medium includes code for causing a computer to determine a set of a plurality of access points, and code for causing a computer to determine a set of PilotPN codes used by the set of the plurality of access points. The medium also includes code for causing a computer to detect whether at least two access points of the plurality of access points have conflicting PilotPN codes, and code for causing a computer to allocate a first PilotPN code to one of the at least two access points having conflicting PilotPN code. Additionally, the medium includes code for causing a computer to allocate at least one second PilotPN code distinct from the first PilotPN code to at least one remaining access point of the at least two access points having conflicting PilotPN codes.

DETAILED DESCRIPTION

The presently disclosed method and apparatus effect resolving pilot pseudorandom noise (PN) code conflicts in a communication system. In particular, the present disclosure relates to methods and apparatus for automated planning of PilotPN codes to resolve PilotPN conflicts through the assistance of access terminal (ATs) communicating PilotID information to access points (APs). It is noted here that the presently disclosed method and apparatus may be viewed in relation to automated neighbor discovery (ND) of access terminals in a communication system, such as was disclosed in U.S. application Ser. No. 12/136,495, filed Jun. 10, 2008 entitled "METHODS AND APPARATUS FOR NEIGHBOR DISCOVERY OF BASE STATIONS IN A COMMUNICATION SYSTEM" by Tinnakornsrisuphap et al., assigned to the assignee hereof, and is expressly incorporated by reference herein.

In the following described examples, for reasons of conciseness and clarity the disclosure uses terminology associated with Ultra Mobile Broadband (UMB) technology. It should be emphasized, however, that the presently described examples are also applicable to other technologies, such as technologies related to Code Division Multiple Access (CDMA), Time Division Multiple Access (TDMA), Frequency Division Multiple Access (FDMA), Orthogonal Frequency Division Multiple Access (OFDMA) and so forth. It will be appreciated by those skilled in the art, that when applying the disclosed methods and apparatus to other technologies, the associated terminology would clearly be different.

Figure 1:
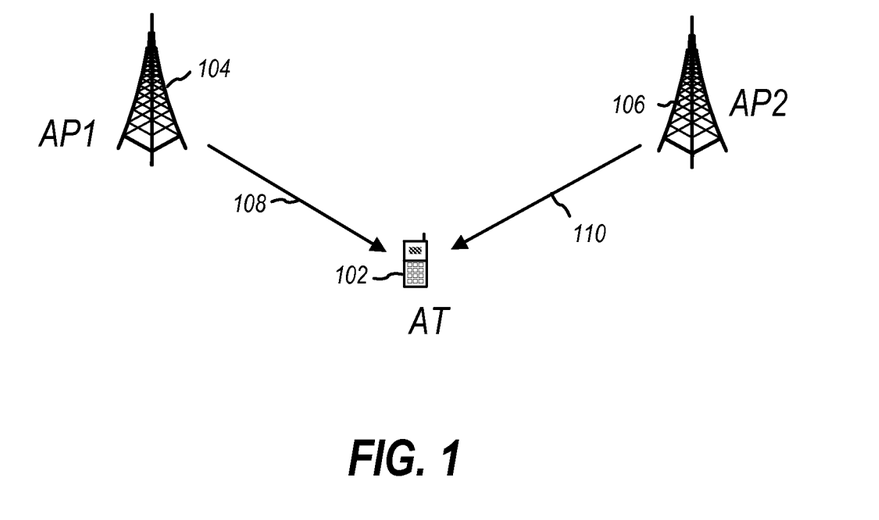
FIG. 1 is an illustrative example of a first tier communication system, which may employ the presently disclosed methods and apparatus for PilotPN planning and conflict resolution.

As pedagogical background concerning collision types, it is noted that in certain communication systems there are two types of collisions that may occur, namely, first-tier collisions and second-tier collisions. FIG. 1 illustrates a communication system in which a first-tier collision may occur. In the first-tier collision scenario, an AT 102 may be in a coverage area of two access points (APs). A first access point AP1 104 may be part of a sector having a SectorID of SectorIDa, as an example, and a second access point AP2 106 is in another sector with a SectorID of SectorIDb. In this example, however, AP1 and AP2 are assumed to both transmit the same PilotPN code, thus resulting in a conflict or collision between two PilotPNs. It is also noted that the PilotPN of each AP 104, 106 need not be identical to cause a conflict, but instead the PN offset may be configured in such a way that it is difficult for the AT 102 to differentiate the difference, thus engendering a conflict.

Figure 2:
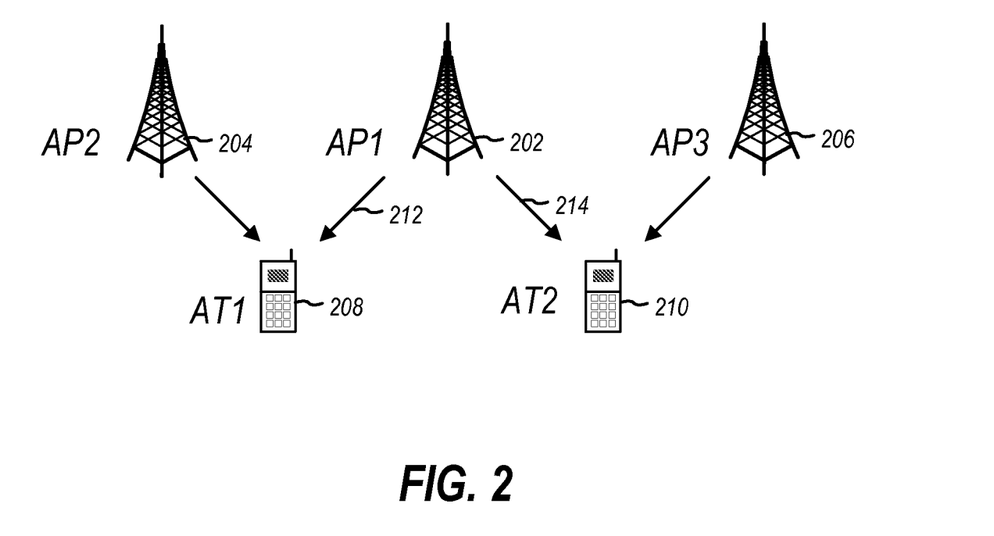
FIG. 2 is an illustrative example of a first tier communication system, which may employ the presently disclosed methods and apparatus for PilotPN planning and conflict resolution.

Using another example to describe a second-tier conflict, FIG. 2 illustrates another communication system in which a second-tier collision situation may arise. In this example, the communication includes a first access point AP1 202, a second access point AP2 204, and a third access point AP3 206. In the system of FIG. 2, a situation that may give rise to a second-tier collision is when AP2 204 and AP3 206 transmit the same PilotPN.

As shown in FIG. 2, a first access terminal AT1 208 and a second access terminal AT2 210 are in a coverage territory of AP1 202 as indicated by wireless links 212 and 214, respectively. It is intended that AT1 208 sense the PilotPN from AP2 204, while the AT2 210 sees the PilotPN from the AP3. Suppose, however, that AT1 208 tries to communicate a message to the AP2 204 though the AP1 202 via a backhaul network (not shown), for example, for reserving resources on AP2. The AT1 208 would then use the PilotPN (or SectorID information) to resolve an address (e.g., an IP address) in order to route such a message via the backhaul. However, the AP1 202 in this case is unable to decide to which access point, i.e., AP2 204 or the AP3 206, the message is to be forwarded. Quite likely, AP1 202 is unaware of the existence of the AP3 206 and thus mistakenly forwards the message to the AP3 206 via the backhaul.

Figure 3:
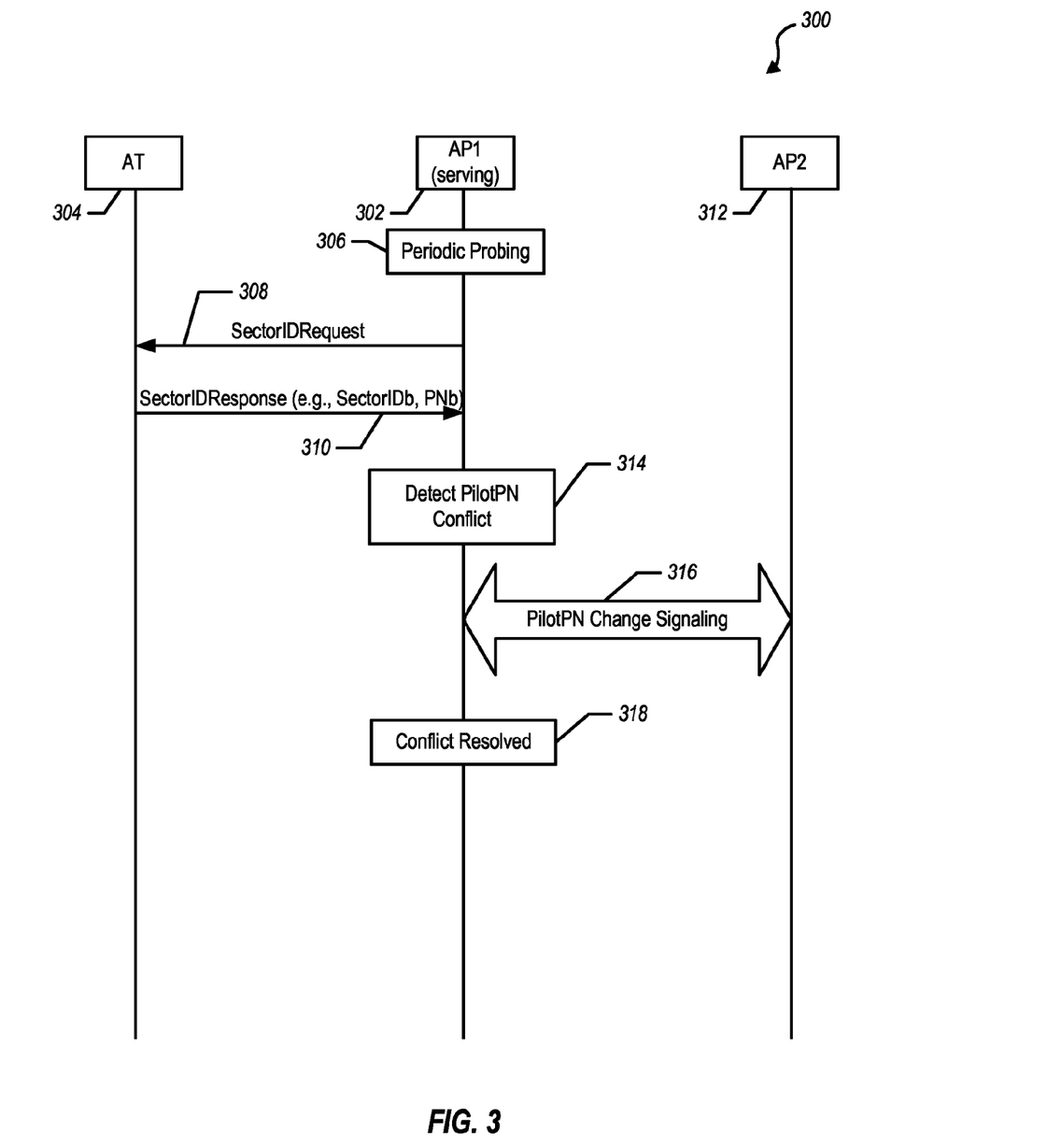
FIG. 3 is a call flow diagram of an exemplary method for resolving conflicts between PilotPNs in a communication system.

In order to resolve conflicts, such as the first and second tier conflicts discussed above, the present application discloses methods and apparatus for resolving conflicts dues to conflicting PilotPNs. According to an aspect, FIG. 3 illustrates a call flow diagram 300 of a methodology that may effect PilotPN conflict resolution in a communication system, such as the systems of FIGS. 1 and 2. An access point AP1 302 may currently serve one or more access terminals, such as shown access terminal AT 304, as an example. AP1 302 may then be configured to periodically probe or query various ATs currently served by AP1 302, as shown by block 306 in order to determine whether two access points in the same region share the same PilotPN.

To accomplish this end, an access point, such as AP1 302, may be configured to periodically send a request message to one or more ATs within its coverage area requesting the SectorIDs, and thus APs, contained in the active sets of the AT's. Message SectorIDRequest 308 from AP1 302 to AT 304 is shown in FIG. 3 as an example. In response to message 308, the AP1 302 receives message reports from the ATs, such as SectorIDResponse 310 from AT 304 as an example. In the particular example of FIG. 3, the response 310 may include a Sector ID of SectorIDb and a PilotPN code PNb that pertain to another access point AT2 312 from which AT1 304 receives or has received signal strength.

The access point receiving the messages (e.g., AP1 302) may then perform detection of PilotPN conflicts from a set of access points or SectorIDs (termed herein as set $S_{SID}$) as indicated by block 314. The set of access points is obtained or determined by the querying of the ATs by AP1 302. According to an aspect, a set of PilotPNs (termed herein as set $S_{PN}$) used within the set of access points (i.e., the set $S_{SID}$) may then be obtained or determined from the queried ATs. If there exists at least two different SectorIDs or APs that have conflicting PilotPNs (i.e., they share the same PilotPN code), the AP1 302 may then be configured to contact one of the APs having a conflicting PilotPN over the backhaul and request a change of PilotPN. Alternatively, mediation may occur by a predetermined access point where the mediator detects the conflicting PilotPN codes and subsequently allocates the PilotPN values for respective APs and communicates the new allocated PilotPN values to the affected APs. These processes are illustrated in the example of FIG. 3 by arrow 316, where communication between AP1 302 and AP2 312. Afterward, the conflict between PilotPNs has been resolved as indicated by block 318. As yet another alternative, it is noted that AP1 302 may change its own PilotPN rather than contacting the other APs as illustrated in FIG. 3.

It is noted that in an aspect the AP1 302, if acting as a mediating AP, may be configured to pick PilotPNs that are not being used by any of the known first-tier or second-tier neighbors. In a further aspect, AP1 302 may find out about the set of PilotPNs that are used by the second-tier neighbors by requesting its neighbors (e.g., first tier neighbors) for information about their neighbors (i.e., second tier neighbors with respect to the requesting AP), such as over the backhaul. Such querying affords the avoidance of PilotPN collisions with both first and second tier neighbors. Furthermore, it is noted that if multiple iterations are being performed (i.e., the processes of the call flow in FIG. 3 are repeated multiple times), the new distinct PilotPN will not be used or allocated in any of the subsequent iterations.

Figure 4:
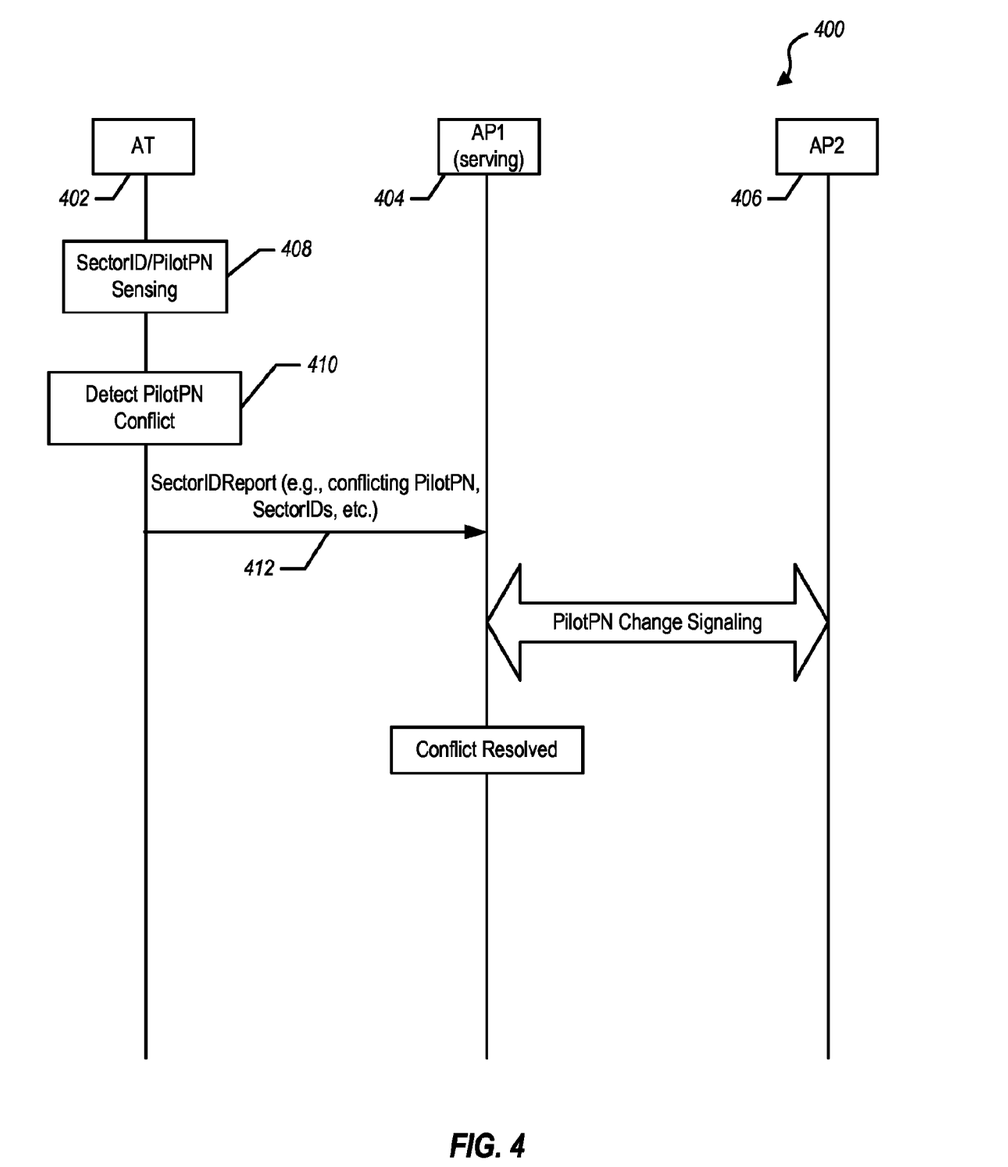
FIG. 4 is a call flow diagram of another exemplary method for resolving conflicts between PilotPNs in a communication system.

According to alternative example, an AT may be configured to initiate autonomously or independently the collision detection and reporting processes. Referring to the call diagram of FIG. 4, as an example, an AT 402 detects two APs 404, 406 in its vicinity having the same PilotPN as indicated by block 408. In this example, the AT 402 may detect more than one AP with the same PilotPN but having different SectorIDs in a predetermined time window, which can be network configured, for example, as illustrated by block 410. The AT would then send a SectorIDReport message 412 to any accessible AP (e.g., serving AP1 404 in this example), in which information regarding the conflicting PilotPN, the Sector IDs of the conflicting APs (if known), signal strength, and the time of measurement (if known) is included. It also should be noted that the additional fields of the SectorIDReport message could be included in response to a SectorIDRequest message from an AP as an alternative (thus the message would be a responsive message). The AP receiving message 412 would then initiate PilotPN mediation according to the processes discussed above with respect to FIG. 3.

Figure 5:
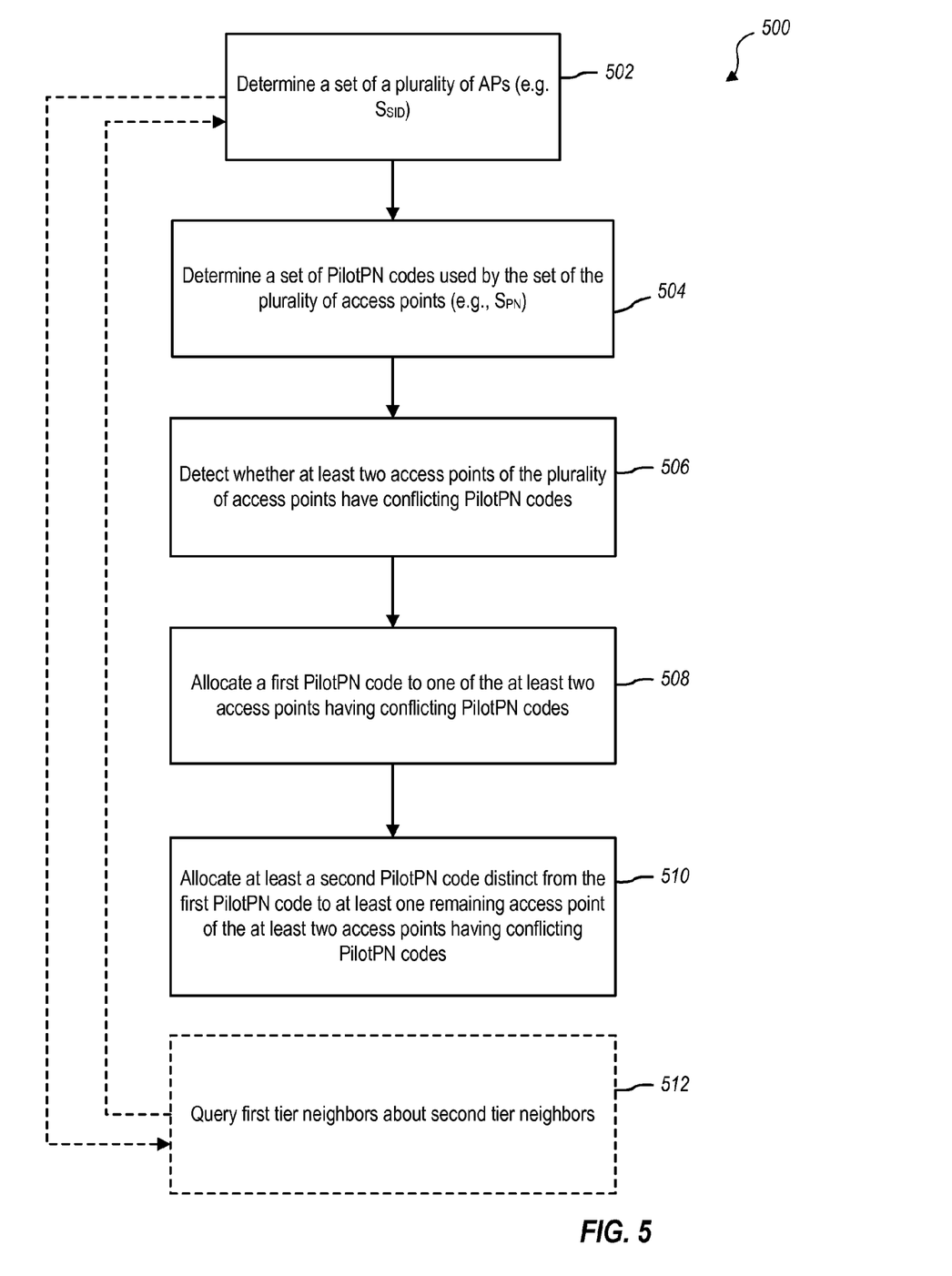
FIG. 5 is a flowchart diagram of an exemplary method that may be used to resolve conflicts between PilotPNs in a communication system.

FIG. 5 illustrates a flow diagram of a method 500 for automated allocation of PilotPNs in a communication system. As shown, the method includes a block 502 where a set of a plurality of APs (e.g. $S_{SID}$) is determined. As noted above, the set of all APs or SectorIDs may be derived with the assistance of one or more ATs served by a particular AP. As also discussed above, particular implementations may include the set of APs being determined within an AP, as shown in FIG. 3, or alternatively being determined by one or more ATs as described in connection with FIG. 4.

After the set of APs is determined, flow proceeds to block 504 where a set of PilotPN codes (e.g., $S_{PN}$) used by the set of the plurality of access points is determined or defined. Again, implementation of the process or functions of block 504 may be effected in a number of alternative devices. In one aspect, this set of PilotPNs may be determined within an AP, such as in the procedure shown in FIG. 3. In an alternative aspect, set $S_{PN}$ may be determined by one or more ATs, as described in connection with FIG. 4.

After determination of the set in block 504, flow proceeds to block 506 where detection is made whether at least two access points of the plurality of access points have conflicting PilotPN codes. According to one particular implementation of the process of block 506, a subset (termed herein as $S_2$) of APs within the set of access points (i.e., $S_{SID}$) may be selected of APs having a distinct PilotPN from the set $S_{PN}$ of PilotPNs. It is noted that since only one occurrence of a PilotPN is allowed for each AP, the number of APs in subset $S_2$ will be equal to the number PilotPNs. Thus, if the subset $S_2$ is less than the number of APs in set $S_{SID}$, it can be deduced that conflicting PilotPNs are extant.

As an example of subset $S_2$ selection, assume three distinct SectorIDs or APs numbered AP1, AP2, and AP3 are extant in set $S_{SID}$. The set $S_{PN}$ of PilotPNs, however, only contains two distinct PilotPNs PN1 and PN2, where PN1 is assumed associated with APs AP1 and AP2 and PN2 is associated with AP3. Accordingly, the subset $S_2$ could contain AP1 and AP3, or alternatively AP2 and AP3 for the occurrences of PN1 and PN2. Accordingly, it is can then be known that there is a conflict concerning multiple uses of PilotPN PN1. Stated another way, the APs in subset $S_2$ may then be allocated respective PilotPNs from the set $S_{PN}$. Thus, it is evident that by excluding allocation of extant PilotPNs to those remaining APs having shared PilotPNs, a determination of a conflict has been identified, as well as determining or identifying those APs that will need to have their PilotPN codes changed.

Similar to the processes of blocks 502 and 504, the processes of block 506 may be effected by various alternate devices. In one aspect, the process of block 506 may be implemented in an AP, such as in the procedure shown in FIG. 3. In an alternative aspect, the processes of block 506 may be determined by one or more ATs, such as was described in connection with FIG. 4. Additionally, if the processes of block 506 are implemented by an AT, the AT may be configured to autonomously send a message to an AP reporting the conflicting PilotPNs where the message is triggered when the conflicting Pilot PNs are determined by the AT. In yet a further alternative, various processes of block 506 may be respectively implemented by an AP and one or more ATs.

After block 506, flow proceeds to block 508 where a first PilotPN code is allocated to one of the at least two APs having conflicting PilotPN codes. Thus, in the particular example from above, AP1 and AP2 have conflicting PilotPN codes (e.g., PN1). Thus, one of AP1 or AP2 could remain allocated with PN1 as the first PilotPN code. Continuing with this example, this allocation may consist of selecting one of AP1 or AP2 to be a member of subset $S_2$, whereas the other AP (or APs in the case of more than two conflicting PNs) would be excluded from the subset. It is noted that the decision of which AP is selected for subset $S_2$ may be arbitrary. Alternatively, the decision of which APs to exclude may be based on various criteria, such as the number of users currently served by an AP or the coverage area of the APs. Concerning the first PilotPN code, it is noted that the first PilotPN code could also consist of an entirely new PilotPN code.

Method 500 also includes allocating at least a second PilotPN code distinct from the first PilotPN code to at least one remaining access point of the at least two access points having conflicting PilotPN codes as illustrated by block 510. Given the above example, the one or more remaining access points excluded from subset $S_2$ (i.e., $S_{SID}$-$S_2$) are assigned or allocated with respective other second PilotPN codes outside of the set $S_{PN}$ of PilotPNs. It is noted that the processes of block 510 may be implemented by AP communication to the other APs on a backhaul to effect the change in the PilotPNs, as one example. It is also contemplated that this messaging may also take place via wireless links, such as between APs if within range and the APs including AT equipment or an equivalent. Additionally, it is contemplated that AT devices could also assist in such messaging over wireless links.

It is also noted that selection of PilotPNs for some or all of the APs could be random and distinct PilotPNs outside the set $S_{PN}$. It is also contemplated, however, that selection could further alternatively be based on a survey of all second tier AP PilotPNs and then selecting PilotPNs outside of that set of PNs. This alternative aspect is further illustrated by the operation of block 512, which is shown dashed accordingly. As may be seen in the example of block 512, a query may be issued by an AP (or AT initiated as a further option) to its first tier neighbor APs during the operation of block 502, for example, to determine second tier neighbor APs when determining the set of the plurality of APs (and the attendant PilotPN codes). This query may be accomplished via messaging over the backhaul, as an example, but could also be accomplished wirelessly via ATs, for example. Accordingly, the set of the plurality of APs and the set of PilotPN codes will account for second tier neighbors when allocating the first PilotPN and the at least second Pilot PN in the operation of blocks 508 and 510. It is further noted that the process 500 may be periodic in nature to effect an iterative algorithm or method for planning or changing PilotPNs in a communication system. In addition, while, for purposes of simplicity of explanation, the methodology is shown and described as a series or number of acts, it is to be understood that the processes described herein are not limited by the order of acts, as some acts may occur in different orders and/or concurrently with other acts from that shown and described herein. For example, those skilled in the art will appreciate that a methodology could alternatively be represented as a series of interrelated states or events, such as in a state diagram. Moreover, not all illustrated acts may be required to implement a methodology in accordance with the subject methodologies disclosed herein.

Figure 6:
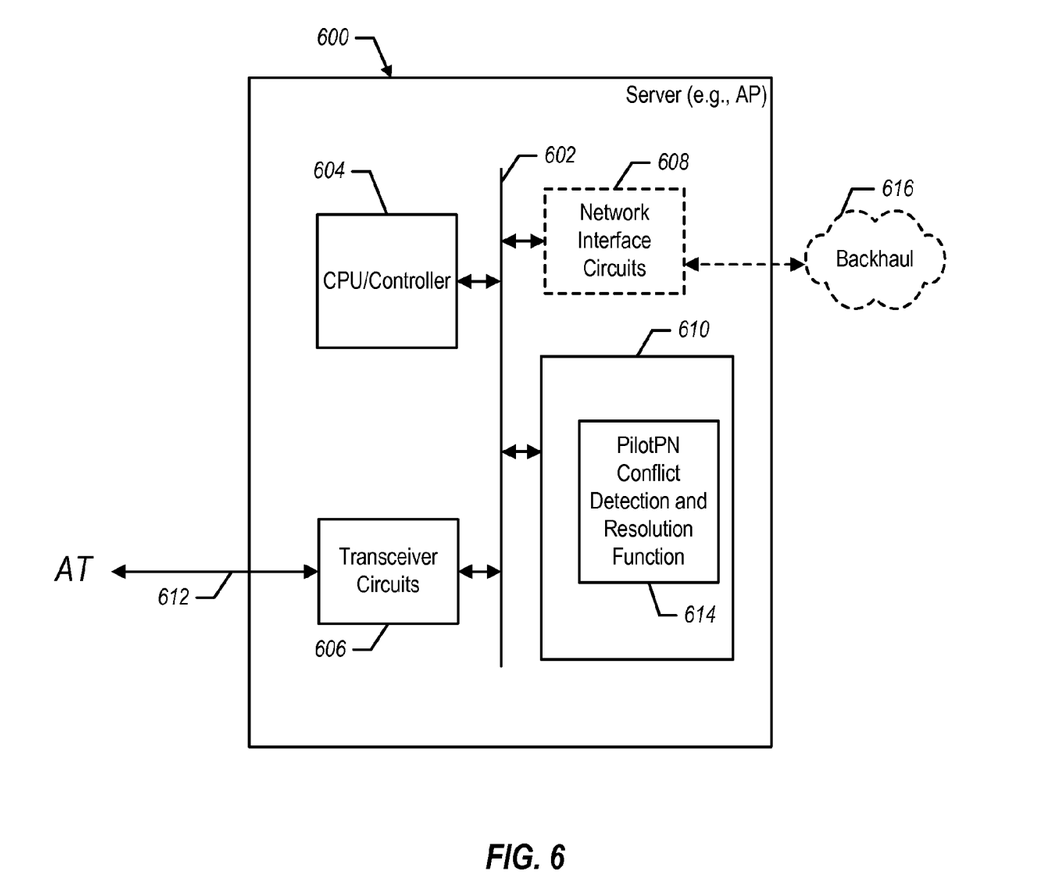
FIG. 6 is an exemplary apparatus that may be utilized in an access point or similar device for resolving conflicts between PilotPNs in a communication system.

FIG. 6 schematically shows an exemplary implementation of an apparatus 600 for executing the methodologies as described above. Apparatus 600 may be implemented in a server implemented with an AP, as merely an example, or any other suitable apparatus. Apparatus 600 may also be implemented as other suitable hardware (e.g., processor, or a collection of circuits/modules), software, firmware, or any combination thereof for use in an AT device The apparatus 600 features a central data bus 602, or similar device for communicatively linking several circuits or modules together. The circuits may include a CPU (Central Processing Unit) or a controller 604 and transceiver circuits 606. The apparatus 600 may also include a memory unit 610 or similar device for storing computer or processor executable instructions.

The transceiver circuits 606 include receiver circuits to process received signals before sending out to the central data bus 602, as well as transmit circuits to process and buffer data from the data bus 602 before sending out of the device 600, such as to one or more ATs. Additionally in the case where apparatus 600 is employed in an AP or base station, the transceiver circuits 606 may include RF circuits to transmit and receive via a wireless link 612 to the one or more AT's.

The CPU/controller 604 may be configured to perform the function of data management of the data bus 602 and further perform the function of general data processing, including executing the instructional contents of the memory unit 610. It is noted here that instead of separately implemented as shown in FIG. 6, as an alternative, the transceiver circuits 606 can be incorporated as parts of the CPU/controller 604. As a further alternative, the entire apparatus 600 may be implemented as an application specific integrated circuit (ASIC) or similar apparatus.

The memory unit 610 may include one or more sets of instructions/modules. In the exemplary apparatus 600, the instructions/modules include, among other things, a PilotPN Conflict Detection and Resolution function 614, which is configured to effect the methodologies described herein. Memory unit 610 may further include other data constructs or structures that store, among other things, the PilotPN and AP (SectorID) data derived from ATs or other APs.

In the example of FIG. 6, the memory unit 610 may be a RAM (Random Access Memory) circuit. The exemplary portions, such as the function 614, are software routines, modules and/or data sets. The memory unit 610 can be tied to another memory circuit (not shown) which either can be of the volatile or nonvolatile type. As an alternative, the memory unit 610 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and other computer-readable media well known in the art.

It is further noted that the apparatus 600 may alternatively include network interface circuits 608 or similar devices that may be used to effect communication of PilotPN information to other APs, such as via a backhaul 616. In particular, the circuits 608 may be used to transmit and receive messages for either receiving or sending PilotPN information to other APs for changing PilotPNs in those APs having conflicting PilotPNs.

Figure 7:
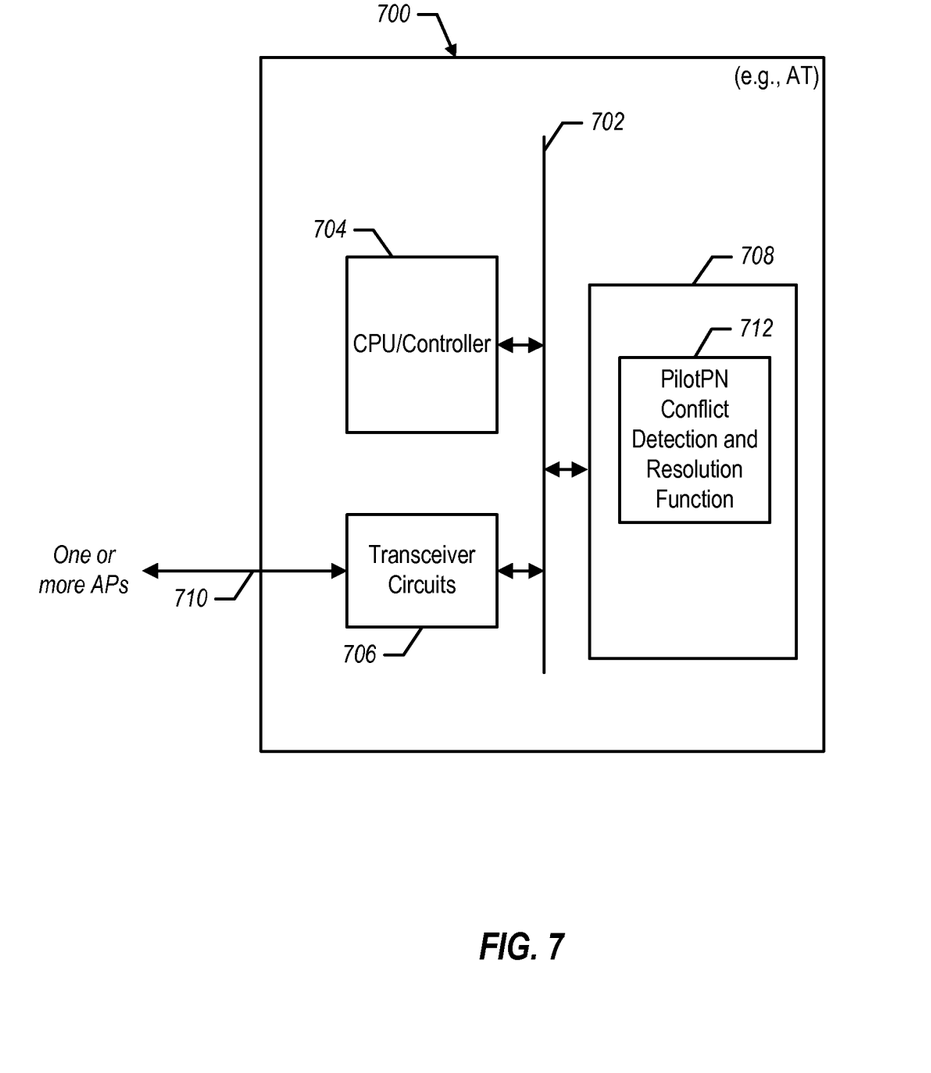
FIG. 7 is another example of an apparatus that may be utilized in an access terminal or similar device for resolving conflicts between PilotPNs in a communication system.

FIG. 7 illustrates another exemplary apparatus 700 that may be utilized to effect the methodologies disclosed herein. It is noted that apparatus 700 may constitute an AT or other suitable hardware (e.g., processor, or a collection of circuits/modules), software, firmware, or any combination thereof for use in an AT device. As illustrated, the apparatus 700 includes a central data bus 702, or similar device for communicatively linking or coupling several circuits together. The circuits include a CPU (Central Processing Unit) or a controller 704, transceiver circuits 706, network, and a memory unit 708.

The transceiver circuits 706 include receiver circuits to process received signals before sending out to the central data bus 702, as well as transmit circuits to process and buffer data from the data bus 702 before sending out of the device 700, such as to one or more APs as illustrated by wireless communication link(s) 710. Accordingly, the transceiver circuits 706 may include RF circuits to transmit over the wireless link 710 to the one or more ATs.

The CPU/controller 706 performs the function of data management of the data bus 702 and further the function of general data processing, including executing the instructional contents of the memory unit 710. It is noted here that instead of separately implemented as shown in FIG. 7, as an alternative, the transceiver circuits 706 can be incorporated as parts of the CPU/controller 704. As a further alternative, the entire apparatus 700 may be implemented as an application specific integrated circuit (ASIC) or similar apparatus.

The memory unit 710 may include one or more sets of instructions/modules. In the exemplary apparatus 700, the instructions/modules include, among other things, a PilotPN Conflict Detection and Resolution function 712, which is configured to effect the methodologies described herein; namely the processes of either of call flow diagrams in FIGS. 3 and 4, as well as one or more processes of the method 500 disclosed in FIG. 5. It is also noted that memory unit 710 may store an active set or list of all APs with which the AT device has visited. This active set may then be used by either an AP (or AT) to derive the set of all APs; namely $S_{SID}$ discussed above.

In the example of FIG. 7, the memory unit 710 may be a RAM (Random Access Memory) circuit. The exemplary portions, such as the function 714, are software routines, modules and/or data sets. The memory unit 710 can be tied to another memory circuit (not shown) which either can be of the volatile or nonvolatile type. As an alternative, the memory unit 710 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and other computer-readable media well known in the art.

Figure 8:
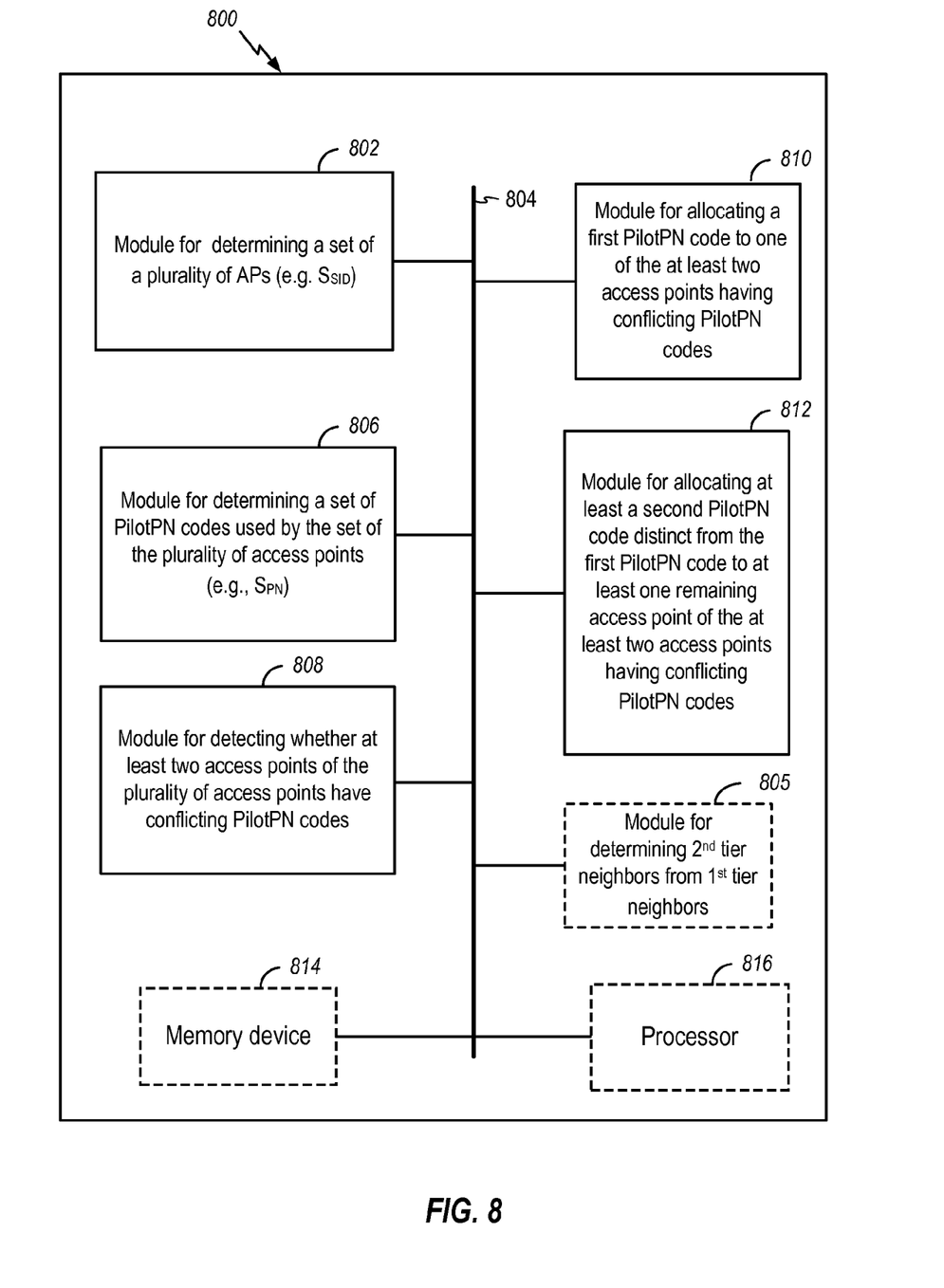
FIG. 8 is yet another example of an apparatus that may be used to resolve conflicts between PilotPNs in a communication system.

FIG. 8 illustrates another apparatus 800 for use in a communication system that may be utilized for resolving PilotPN collisions or conflicts. It is noted that the apparatus 800, may be implemented in an AP, as one example. It should be further noted, that disclosed apparatus 800 is not limited to implementation only in an AP, but may transcend implementation solely in an AP by also including implementation of the disclosed functional means or modules, or portions thereof, in one or more AT devices.

Apparatus 800 includes a module or means 802 for determining a set of a plurality of APs (e.g. $S_{SID}$). It is noted that module 802 may be implemented by both components or modules within an AP as well as components or modules in one or more ATs. Furthermore, the module 802 may be implemented with components in the AP that initiate queries to various ATs in its coverage area, as well as components in one or more ATs that respond with PilotPN information to the querying AP as was discussed previously in connection with the call flow diagram in FIG. 3. Alternatively, the module 802 may also be implemented with components in an AP and ATs that are configured to implement the call flow of FIG. 4 where one or more AT devices serve to initiate the function of determining the set of the plurality of APs. The information received by module 802 may then be communicated to various other modules or means in apparatus 800 via a bus 804, or similar suitable communication coupling.

It is also contemplated, however, that selection by module 802 could further be implemented with the assistance or addition of an alternative module or means 805 that affords the determination to be based on a survey of all second tier AP PilotPNs and then selecting PilotPNs outside of that set of PNs. Module 805 for determining second tier neighbors from first tier neighbors effects initiation of a query that may be issued by an AP (or AT initiated as a further option) to its first tier neighboring APs via a backhaul, as an example, to obtain information of neighboring APs known to those APs, which are second tier neighbors to apparatus 800. From the second tier APs, module 805 then also assists in the determination of a set of the attendant PilotPN codes. Thus, the addition of the functionality of module 805 may ensure that the set of the plurality of APs and the set of PilotPN codes will account for second tier neighbors when allocating the first PilotPN and the at least second Pilot PN codes.

The set of APs (and associated PilotPNs) may be communicated by module 802 to a module or means 806 for determining a set of PilotPN codes (e.g., $S_{PN}$) used by the set of the plurality of access points. Module 806 may be implemented, as an example, by components within an AP, an AT, or a combination thereof. Exemplary functions that may be employed by module 806 include the functions described above in connection with FIGS. 3, 4 and 5.

Apparatus 800 further includes a module or means 808 for detecting whether at least two access points of the plurality of access points have conflicting PilotPN codes based on the sets determined by modules 802 and 806, for example. Similar to modules 802 and 806, this module 808 may be implemented, as an example, by components within an AP, an AT, or a combination thereof. Exemplary functions that may be employed by module 806 include the functions described above in connection with FIGS. 3, 4 and 5.

Apparatus 800 also includes a module or means 810 for allocating a first PilotPN code to one of the at least two access points having conflicting PilotPN codes. A module 812 is also featured for allocating at least a second PilotPN code distinct from the first PilotPN code to at least one remaining access point of the at least two access points having conflicting PilotPN codes. It is noted that modules 810 and 812 may be implemented within or by an AP, as an example. It is further noted that either of these modules may be configured to communicate allocated PilotPN codes to one or more other APs in order to effect changes to the PilotPNs of those APs selected to have their PNs changed.

In addition, the apparatus 800 may include an optional computer readable medium or memory device 814 configured to store computer readable instructions and data for effecting the processes and behavior of one or more of the modules in apparatus 800. Additionally, apparatus 800 may include a processor 816 configured to execute the computer readable instructions in memory 814, and thus may be configured to execute one or more functions of the various modules in apparatus 800.

In light of the above discussion, it can be appreciated that the presently disclosed methods and apparatus afford automated planning/conflict resolution for PilotPN codes in a communication system. It is noted that by iterative or periodic discovery of APs and associated PilotPNs, conflicts between PilotPNs may be effectively discovered before an actual PilotPN collision occurs. It will also be appreciated by those skilled in the art that the present methods and apparatus are thus effective in mitigating the adverse effects of such collisions on operations such as signal demodulation, decoding, and further network side routing.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, means, and steps have been described above generally in terms of their functionality. Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium (not shown) may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. It is noted that the word "exemplary" is used exclusively herein to mean "serving as an example, instance, or illustration." Any example described herein as "exemplary" is not necessarily to be construed as preferred or advantageous over other examples. Accordingly, the novel aspects described herein are to be defined solely by the scope of the following claims.

The invention claimed is:

1. A method for allocating (Pilot Pseudorandom Noise) PilotPN codes in a communication system, the method comprising:
    determining a set of a plurality of access points from at least one response to a request to identify access points sent by an access point; determining a set of PilotPN codes used by the set of the plurality of access points; detecting, by the access point, whether at least two access points of the plurality of access points have conflicting PilotPN codes; allocating a first PilotPN code to one of the at least two access points having conflicting PilotPN codes; allocating at least one second PilotPN code distinct from the first PilotPN code to at least one remaining access point of the at least two access points having conflicting PilotPN codes, wherein the at least one second PilotPN code is additionally distinct from each PilotPN code in the set of PilotPN codes used by the set of the plurality of access points; and sending at least one message from the access point causing an allocation of the first PilotPN code and the at least one second PilotPN code and to instruct the at least one remaining access point to change to the at least one second PilotPN code.

2. The method as defined in claim 1, wherein the conflicting PilotPN codes comprise one of two or more access points utilizing identical PilotPN codes or two or more access points having PilotPN code offsets insufficient to enable distinguishing between the respective PilotPN codes of the two or more access points.

3. The method as defined in claim 1, wherein the first PilotPN code is a same PilotPN code as an original PilotPN code allocated to the one of the at least two access points having conflicting PilotPN codes.

4. The method as defined in claim 1, wherein the set of the plurality of access points includes a first tier network of the access point and a second tier network in a vicinity of the access point.

5. The method as defined in claim 1, wherein the first PilotPN code is a new randomly selected PilotPN code.

6. The method as defined in claim 1, wherein determining the set of the plurality of access points and determining the set of PilotPN codes used by the set of the plurality of access points is initiated by the access point.

7. The method as defined in claim 1, wherein determining the set of the plurality of access points comprises:
    deriving the set of the plurality of access points from a list of access points identified in the at least one response from at least one access terminal.

8. The method as defined in claim 1, wherein determining the set of the plurality of access points further comprises:
    sending a message to a second access point requesting neighboring second tier access points known to the second access point.

9. The method as defined in claim 8, wherein the message is sent over a backhaul network.

10. The method as defined in claim 1, wherein the set of the plurality of access points comprises a union of access points known to the access point, first tier neighbors of the access point, and second tier neighbors of the access point. remaining access point to change to the at least one second PilotPN code.

11. The method of claim 1, wherein allocating the first PilotPN code further comprises allocating based on a characteristic of the two or more access points.

12. The method of claim 11, wherein allocating based on the characteristic further comprises allocating based on a number of users being served or based on a coverage area.

13. The method of claim 1, further comprising:
    obtaining a set of second tier PilotPN codes used by a second tier set of access points neighboring the access point; and
    wherein the allocating of the at least one second PilotPN code is further distinct from the set of second tier PilotPN codes.

14. The method of claim 1, wherein the detecting of the conflicting PilotPN codes further comprises detecting that the two or more access points have PilotPN code offsets insufficient to enable distinguishing between the respective PilotPN codes of the two or more access points.

15. An apparatus for use in a communication system: comprising:
    means for determining a set of a plurality of access points from at least one response to a request to identify access points sent by an access point;
    means for determining a set of (Pilot Pseudorandom Noise) PilotPN codes used by the set of the plurality of access points; means for detecting, by the access point, whether at least two access points of the plurality of access points have conflicting PilotPN codes; means for allocating a first PilotPN code to one of the at least two access points having conflicting PilotPN codes; means for allocating at least one second PilotPN code distinct from the first PilotPN code to at least one remaining access point of the at least two access points having conflicting PilotPN codes, wherein the at least one second PilotPN code is additionally distinct from each PilotPN code in the set of PilotPN codes used by the set of the plurality of access points; and means for sending at least one message from the access point causing an allocation of the first PilotPN code and the at least one second PilotPN code and to instruct the at least one remaining access point to change to the at least one second PilotPN code.

16. The apparatus as defined in claim 15, wherein the conflicting PilotPN codes comprise one of two or more access points utilizing identical PilotPN codes or two or more access points having PilotPN code offsets insufficient to enable distinguishing between the respective PilotPN codes of the two or more access points.

17. The apparatus as defined in claim 15, wherein the first PilotPN code is a same PilotPN code as an original PilotPN code allocated to the one of the at least two access points having conflicting PilotPN codes.

18. The apparatus as defined in claim 15, wherein the set of the plurality of access points includes a first tier network of the access point and a second tier network in a vicinity of the access point.

19. The apparatus as defined in claim 15, wherein the first PilotPN code is a new randomly selected PilotPN code.

20. The apparatus as defined in claim 15, wherein determining the set of the plurality of access points and determining the set of PilotPN codes used by the set of the plurality of access points is initiated by access point.

21. The apparatus as defined in claim 15, wherein determining the set of the plurality of access points comprises:
deriving the set of the plurality of access points from a list of access points identified in the at least one response from at least one access terminal.

22. The apparatus as defined in claim 15, wherein determining the set of the plurality of access points further comprises:
sending a message to a second access point requesting neighboring second tier access points known to the second access point.

23. The apparatus as defined in claim 22, wherein the message is sent over a backhaul network.

24. The apparatus as defined in claim 15, wherein the set of the plurality of access points comprises a union of access points known to the access point, first tier neighbors of the first access point, and second tier neighbors of the access point.

25. An apparatus for use in allocating PilotPN codes in a communication network, comprising:
a processor for:
determining a set of PilotPN codes used by a set of a plurality of access points from at least one response to a request to identify access points sent by an access point;
detecting, by the access point, whether at least two access points of the plurality of access points have conflicting PilotPN codes;
allocating a first PilotPN code to one of the at least two access points having conflicting PilotPN codes;
allocating at least one second PilotPN code distinct from the first PilotPN code to at least one remaining access point of the at least two access points having conflicting PilotPN codes, wherein the at least one second PilotPN code is additionally distinct from each PilotPN code in the set of PilotPN codes used by the set of the plurality of access points; and
sending at least one message from the access point causing an allocation of the first PilotPN code and the at least one second PilotPN code and to instruct the at least one remaining access point to change to the at least one second PilotPN code; and
a memory coupled to the processor.

26. A program recorded on a non-transitory computer recordable medium and executable on a computer, comprising the steps of:
determining a set of a plurality of access points from at least one response to a request to identify access points sent by an access point; determining a set of (Pilot Pseudorandom Noise) PilotPN codes used by the set of the plurality of access points; detecting, by the access point, whether at least two access points of the plurality of access points have conflicting PilotPN codes; allocating a first PilotPN code to one of the at least two access points having conflicting PilotPN codes; allocating at least one second PilotPN code distinct from the first PilotPN code to at least one remaining access point of the at least two access points having conflicting PilotPN codes, wherein the at least one second PilotPN code is additionally distinct from each PilotPN code in the set of PilotPN codes used by the set of the plurality of access points; and sending at least one message from the access point causing an allocation of the first PilotPN code and the at least one second PilotPN code and to instruct the at least one remaining access point to change to the at least one second PilotPN code.

* * * * *